(12) United States Patent
Johnson et al.

(10) Patent No.: US 6,410,660 B1
(45) Date of Patent: Jun. 25, 2002

(54) POLYMERIZATION OF OLEFINS

(75) Inventors: Lynda Kaye Johnson; Joel David Citron, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/273,410

(22) Filed: Mar. 22, 1999

Related U.S. Application Data

(60) Provisional application No. 60/079,734, filed on Mar. 27, 1998.

(51) Int. Cl.$^7$ .............................. C08F 4/642; C08F 4/70; C08F 4/80
(52) U.S. Cl. ....................... 526/115; 526/113; 526/117; 526/118; 526/119; 526/172; 525/240; 502/155
(58) Field of Search .................................. 526/115, 117, 526/118, 119, 113, 172

(56) References Cited

U.S. PATENT DOCUMENTS

| | | | |
|---|---|---|---|
| 5,880,241 A | | 3/1999 | Brookhart et al. .......... 526/348 |
| 6,194,341 B1 | * | 2/2001 | Canich et al. .............. 502/113 |

FOREIGN PATENT DOCUMENTS

| | | | |
|---|---|---|---|
| WO | WO 97/02298 | 6/1996 | ............ C08F/10/02 |
| WO | WO 97/48735 | 12/1997 | ............. C08F/4/70 |
| WO | WO97/48735 | * 12/1997 | |
| WO | WO 98/30609 | 1/1998 | ........... C08F/10/00 |
| WO | WO 98/30610 | 1/1998 | ........... C08F/10/00 |
| WO | WO98/42664 | 10/1998 | ......... C07D/207/00 |
| WO | WO 98/42665 | 10/1998 | ......... C07D/207/00 |

OTHER PUBLICATIONS

ACS/CAS abstract No. 116:20639 of Pomogailo et al., Koord. Khim. 17(10) pp. 1389–1393, 1991.*
ACS/CAS abstract No. 92:214884 of Yuffa et al., Otkrytiya, Izobret., Prom. Obraztsy, Tovarnye Znaki (3), p. 105, 1980.*
PCT International Search Report, International Application No. PCT/US99/06314, dated Jul. 20, 1999.

* cited by examiner

*Primary Examiner*—David W. Wu
*Assistant Examiner*—R. Rabago

(57) ABSTRACT

Mixtures of different polyolefins may be made by direct, preferably simultaneous, polymerization of one or more polymerizable olefins using two or more transition metal containing active polymerization catalyst systems, one of which contains nickel complexed to selected ligands. The polyolefin products may have polymers that vary in molecular weight, molecular weight distribution, crystallinity, or other factors, and are useful as molding resins and for films.

20 Claims, No Drawings

POLYMERIZATION OF OLEFINS

This application claims the benefit of U.S. Provisional application No. 60/079,734 filed Mar. 27, 1998.

FIELD OF THE INVENTION

Polymers with varied and useful properties may be produced in processes using at least two polymerization catalysts, at least one of which is a selected nickel polymerization catalyst, for the synthesis of polyolefins.

TECHNICAL BACKGROUND

Polyolefins are most often prepared by polymerization processes in which a transition metal containing catalyst system is used. Depending on the process conditions used and the catalyst system chosen, polymers, even those made from the same monomer(s) may have varying properties. Some of the properties which may change are molecular weight and molecular weight distribution, crystallinity, melting point, and glass transition temperature. Except for molecular weight and molecular weight distribution, branching can affect all the other properties mentioned.

It is known that certain transition metal containing polymerization catalysts, especially those containing late transition metals such as nickel, are especially useful in varying the branching in polyolefins made with them, see for instance World Patent Applications 96/23010 and 97/02298, and U.S. patent application Ser. No. 09/006,628, filed Jan. 13, 1998 (now U.S. Pat. No. 6,060,569), and Ser. No. 09/006,536, filed Jan. 13, 1998 (now U.S. Pat. No. 6,174,975), and World Patent Applications 98/30610 and 98/30609. It is also known that blends of distinct polymers, that vary for instance in the properties listed above, may have advantageous properties compared to "single" polymers. For instance it is known that polymers with broad or bimodal molecular weight distributions may be melt processed (be shaped) more easily than narrower molecular weight distribution polymers. Similarly, thermoplastics such as crystalline polymers may often be toughened by blending with elastomeric polymers.

Therefore, methods of producing polymers which inherently produce polymer blends are useful especially if a later separate (and expensive) polymer mixing step can be avoided. However in such polymerizations one should be aware that two different catalysts may interfere with one another, or interact in such a way as to give a single polymer.

SUMMARY OF THE INVENTION

This invention concerns a process for the polymerization of olefins, comprising, contacting under polymerizing conditions:

(a) a first active polymerization catalyst for said olefins which contains a Ni complex of a ligand selected from the group consisting of:

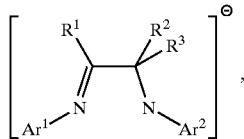

(I)

-continued

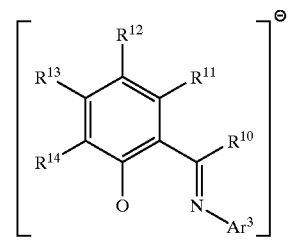

(II)

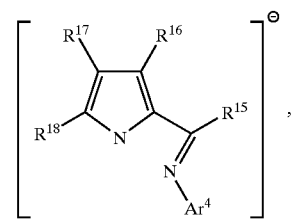

(III)

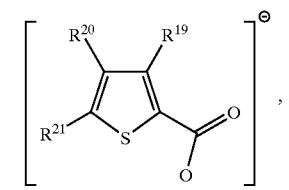

(IV)

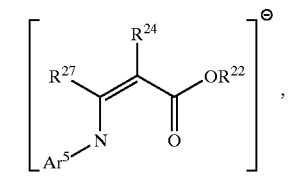

(V)

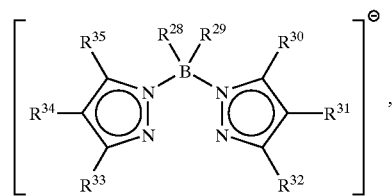

(VI)

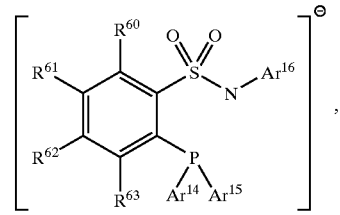

(VII)

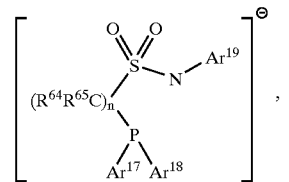

(VIII)

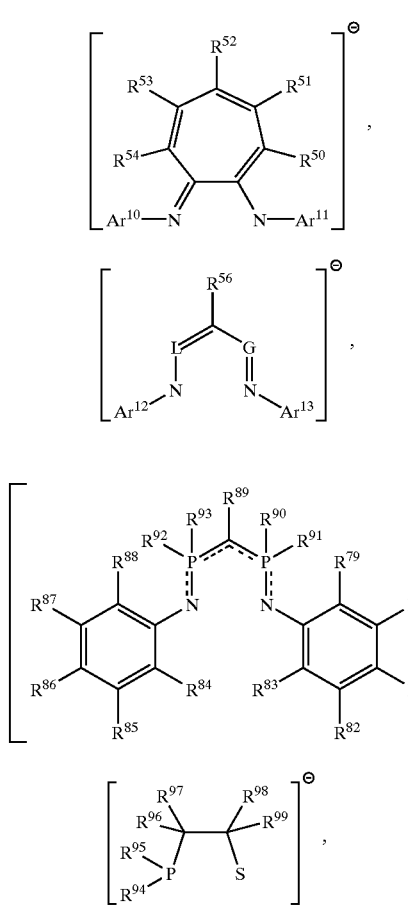

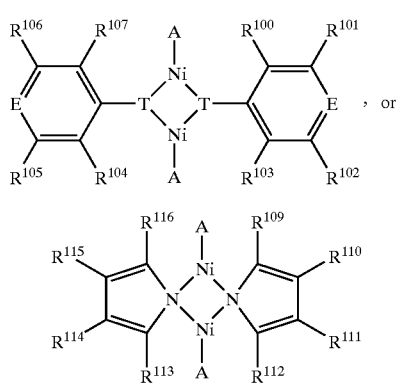

or a compound of the formula wherein:
$Ar^1$, $Ar^2$, $Ar^4$, $Ar^5$, $Ar^{10}$, $Ar^{11}$, $Ar^{12}$ and $Ar^{13}$ are each independently aryl or substituted aryl;

$R^1$ and $R^2$ are each independently hydrogen, hydrocarbyl, substituted hydrocarbyl, or $R^1$ and $R^2$ taken together form a ring, and $R^3$ is hydrogen, hydrocarbyl or substituted hydrocarbyl or $R^1$, $R^2$ and $R^3$ taken together form a ring;

A is a π-allyl or π-benzyl group;

$R^{10}$ and $R^{15}$ are each independently hydrogen, hydrocarbyl or substituted hydrocarbyl;

$R^{11}$, $R^{12}$, $R^{13}$, $R^{14}$, $R^{16}$, $R^{17}$, $R^{18}$, $R^{19}$, $R^{20}$, $R^{21}$, $R^{30}$, $R^{31}$, $R^{32}$, $R^{33}$, $R^{34}$, $R^{35}$, $R^{50}$, $R^{51}$, $R^{52}$, $R^{53}$ and $R^{54}$ are each independently hydrogen, hydrocarbyl, substituted hydrocarbyl, an inert functional group, and provided that any two of these groups vicinal to one another taken together may form a ring;

K is N or $CR^{27}$;

$R^{22}$ is hydrocarbyl, substituted hydrocarbyl, —$SR^{117}$, —$OR^{117}$, or —$NR^{118}{}_2$, $R^{24}$ is hydrogen, a functional group, hydrocarbyl or substituted hydrocarbyl, and $R^{27}$ is hydrocarbyl or substituted hydrocarbyl, and provided that $R^{22}$ and $R^{24}$ or $R^{24}$ and $R^{27}$ taken together may form a ring;

$R^{60}$, $R^{61}$, $R^{62}$ and $R^{63}$ are each independently hydrogen, hydrocarbyl, substituted hydrocarbyl, or an inert functional group;

$R^{64}$ and $R^{65}$ are each independently hydrogen, hydrocarbyl or substituted hydrocarbyl;

n is 1, 2 or 3;

$Ar^{14}$, $Ar^{15}$, $Ar^{16}$, $Ar^{17}$, $Ar^{18}$ and $Ar^{19}$ are each independently hydrocarbyl or substituted hydrocarbyl;

$R^{117}$ is hydrocarbyl or substituted hydrocarbyl;

each $R^{118}$ is independently hydrogen, hydrocarbyl or substituted hydrocarbyl;

G and L are both N or G is $CR^{57}$ and L is $CR^{55}$;

$R^{55}$, $R^{56}$ and $R^{57}$ are each independently hydrogen, hydrocarbyl or substituted hydrocarbyl, or any two of $R^{55}$, $R^{56}$ and $R^{57}$ taken together form a ring;

$R^{67}$ is hydrogen, alkyl or substituted alkyl;

$R^{77}$ is hydrocarbyl or substituted hydrocarbyl;

$Ar^3$ is hydrocarbyl or substituted hydrocarbyl;

$R^{79}$, $R^{80}$, $R^{81}$, $R^{82}$, $R^{83}$, $R^{84}$, $R^{85}$, $R^{86}$, $R^{87}$, $R^{88}$ and $R^{89}$ are each independently hydrogen, hydrocarbyl, substituted hydrocarbyl, or a functional group;

$R^{90}$, $R^{91}$, $R^{92}$ and $R^{93}$ are each independently hydrocarbyl or substituted hydrocarbyl;

$R^{94}$ and $R^{95}$ are each independently hydrocarbyl or substituted hydrocarbyl;

$R^{96}$, $R^{97}$, $R^{98}$, and $R^{99}$ are each independently hydrogen, hydrocarbyl, substituted hydrocarbyl or a functional group;

both of T are S (sulfur) or NH (amino);

each E is N (nitrogen) or $CR^{108}$ wherein $R^{108}$ is hydrogen, hydrocarbyl, substituted hydrocarbyl or a functional group;

$R^{100}$, $R^{101}$, $R^{102}$, $R^{103}$, $R^{104}$, $R^{105}$, $R^{106}$, and $R^{107}$ are each independently hydrogen, hydrocarbyl, substituted hydrocarbyl, or a functional group;

$R^{109}$, $R^{110}$, $R^{111}$, $R^{112}$, $R^{113}$, $R^{114}$, $R^{115}$ and $R^{116}$ are each independently hydrogen, hydrocarbyl, substituted hydrocarbyl or a functional group;

s is an integer of 1 or more; and $R^{28}$ and $R^{29}$ are each independently hydrogen, hydrocarbyl or substituted hydrocarbyl;

(b) a second active polymerization catalyst for said olefins which contains one or more transition metals;

(c) a least one first olefin capable of being polymerized by said first active polymerization catalyst; and (d) at least one second olefin capable of being polymerized by said second active polymerization catalyst.

This invention also concerns a polymerization catalyst component, comprising:

(a) a first active polymerization catalyst for said olefins which contains a Ni complex of a ligand selected from the group consisting of:

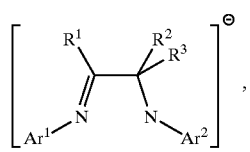
(I)
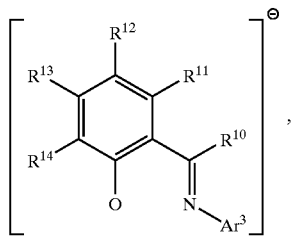
(II)
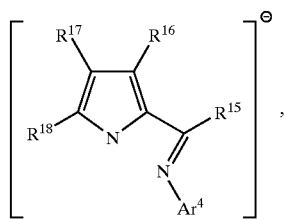
(III)
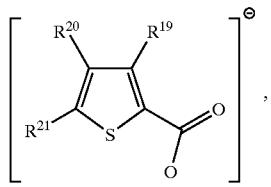
(IV)
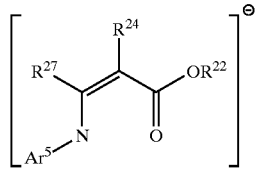
(V)
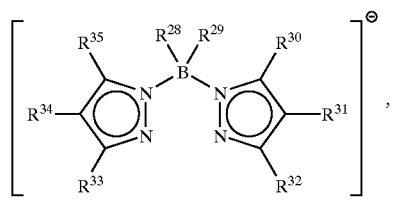
(VI)
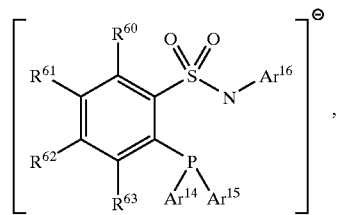
(VII)
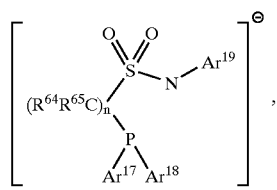
(VIII)
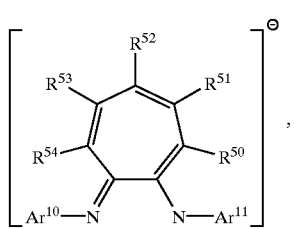
(XVIII)
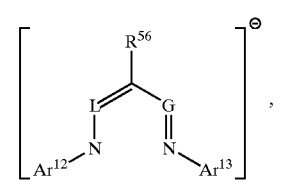
(XXVII)
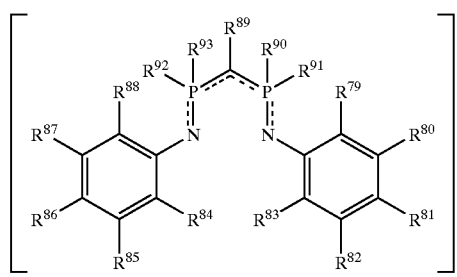
(XXXVII)
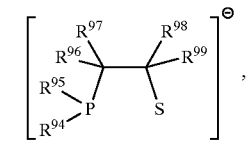
, or
(XXXVIII)
or a compound of the formula
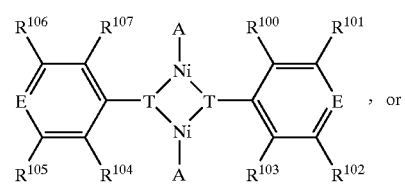
(XXXIX)
, or
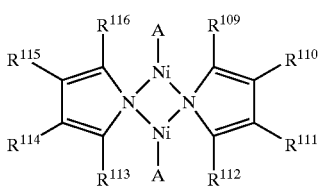
(XXXX)

wherein:

Ar$^1$, Ar$^2$, Ar$^4$, Ar$^5$, Ar$^{10}$, Ar$^{11}$, Ar$^{12}$ and Ar$^{13}$ are each independently aryl or substituted aryl;

R$^1$ and R$^2$ are each independently hydrogen, hydrocarbyl, substituted hydrocarbyl, or R$^1$ and R$^2$ taken together form a ring, and R$^3$ is hydrogen, hydrocarbyl or substituted hydrocarbyl or R$^1$, R$^2$ and R$^3$ taken together form a ring;

A is a π-allyl or π-benzyl group;

R$^{10}$ and R$^{15}$ are each independently hydrogen, hydrocarbyl or substituted hydrocarbyl;

R$^{11}$, R$^{12}$, R$^{13}$, R$^{14}$, R$^{16}$, R$^{17}$, R$^{18}$, R$^{19}$, R$^{20}$, R$^{21}$, R$^{30}$, R$^{31}$, R$^{32}$, R$^{33}$, R$^{34}$, R$^{35}$, R$^{50}$, R$^{51}$, R$^{52}$, R$^{53}$ and R$^{54}$ are each independently hydrogen, hydrocarbyl, substituted hydrocarbyl, an inert functional group, and provided that any two of these groups vicinal to one another taken together may form a ring;

K is N or CR$^{27}$;

R$^{22}$ is hydrocarbyl, substituted hydrocarbyl, —SR$^{117}$, —OR$^{117}$, or —NR$^{118}{}_2$, R$^{24}$ is hydrogen, a functional group, hydrocarbyl or substituted hydrocarbyl, and R$^{27}$ is hydrocarbyl or substituted hydrocarbyl, and provided that R$^{22}$ and R$^{24}$ or R$^{24}$ and R$^{27}$ taken together may form a ring;

R$^{60}$, R$^{61}$, R$^{62}$ and R$^{63}$ are each independently hydrogen, hydrocarbyl, substituted hydrocarbyl, or an inert functional group;

R$^{64}$ and R$^{65}$ are each independently hydrogen, hydrocarbyl or substituted hydrocarbyl;

n is 1, 2 or 3;

Ar$^{14}$, Ar$^{15}$, Ar$^{16}$, Ar$^{17}$, Ar$^{18}$ and Ar$^{19}$ are each independently hydrocarbyl or substituted hydrocarbyl;

R$^{117}$ is hydrocarbyl or substituted hydrocarbyl;

each R$^{118}$ is independently hydrogen, hydrocarbyl or substituted hydrocarbyl;

G and L are both N or G is CR$^{57}$ and L is CR$^{55}$;

R$^{55}$, R$^{56}$ and R$^{57}$ are each independently hydrogen, hydrocarbyl or substituted hydrocarbyl, or any two of R$^{55}$, R$^{56}$ and R$^{57}$ taken together form a ring;

R$^{67}$ is hydrogen, alkyl or substituted alkyl;

R$^{77}$ is hydrocarbyl or substituted hydrocarbyl;

Ar$^3$ is hydrocarbyl or substituted hydrocarbyl;

R$^{79}$, R$^{80}$, R$^{81}$, R$^{82}$, R$^{83}$, R$^{84}$, R$^{85}$, R$^{86}$, R$^{87}$, R$^{88}$ and R$^{89}$ are each independently hydrogen, hydrocarbyl, substituted hydrocarbyl, or a functional group;

R$^{90}$, R$^{91}$, R$^{92}$ and R$^{93}$ are each independently hydrocarbyl or substituted hydrocarbyl;

R$^{94}$ and R$^{95}$ are each independently hydrocarbyl or substituted hydrocarbyl;

R$^{96}$, R$^{97}$, R$^{98}$, and R$^{99}$ are each independently hydrogen, hydrocarbyl, substituted hydrocarbyl or a functional group;

both of T are S (sulfur) or NH (amino);

each E is N (nitrogen) or CR$^{108}$ wherein R$^{108}$ is hydrogen, hydrocarbyl, substituted hydrocarbyl or a functional group;

R$^{100}$, R$^{101}$, R$^{102}$, R$^{103}$, R$^{104}$, R$^{105}$, R$^{106}$, and R$^{107}$ are each independently hydrogen, hydrocarbyl, substituted hydrocarbyl, or a functional group;

R$^{109}$, R$^{110}$, R$^{111}$, R$^{112}$, R$^{113}$, R$^{114}$, R$^{115}$ and R$^{116}$ are each independently hydrogen, hydrocarbyl, substituted hydrocarbyl or a functional group;

s is an integer of 1 or more; and

R$^{28}$ and R$^{29}$ are each independently hydrogen, hydrocarbyl or substituted hydrocarbyl;

(b) a second active polymerization catalyst for said olefins which contains one or more transition metals;

(c) a catalyst support; and (d) optionally one or more polymerization catalyst activators for one or both of (a) and (b).

DETAILS OF THE INVENTION

In the polymerization processes and catalyst compositions described herein certain groups may be present.

By hydrocarbyl is meant a univalent radical containing only carbon and hydrogen.

By substituted hydrocarbyl herein is meant a hydrocarbyl group which contains one or more (types of) substitutents that does not interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents are halo, ester, amino, imino, carboxyl, phosphite, phosphonite, phosphine, phosphinite, thioether, and amide. Which substitutents are useful in which polymerizations may in some cases be determined by reference to U.S. patent applications 09/006,628, filed Jan. 13, 1998 (now U.S. Pat. No. 6,060,569), and 09/006536, filed Jan. 13, 1998 (now U.S. Pat. No. 6,174,975), and World Patent Applications 98/30610 and,98/30609, all of which are hereby included by reference.

By (substituted) hydrocarbylene is meant a group analogous to hydrocarbyl, except the radical is divalent.

By benzyl is meant the $C_6H_5CH_2$— radical, and substituted benzyl is a radical in which one or more of the hydrogen atoms is replaced by a substituent group (which may include hydrocarbyl).

By an aryl moiety is meant a univalent group whose free valence is to a carbon atom of an aromatic ring. The aryl moiety may contain one or more aromatic ring and may be substituted by inert groups. By phenyl is meant the $C_6H_5$— radical, and a phenyl moiety or substituted phenyl is a radical in which one or more of the hydrogen atoms is replaced by a substituent group (which may include hydrocarbyl). Preferred substituents for substituted benzyl and phenyl include those listed above for substituted hydrocarbyl, plus hydrocarbyl. If not otherwise stated, hydrocarbyl, substituted hydrocarbyl and all other groups containing carbon atoms, such as alkyl, preferably contain 1 to 20 carbon atoms.

By "(inert) functional group" herein is meant a group other than hydrocarbyl or substituted hydrocarbyl which is inert under the process conditions to which the compound containing the group is subjected. The functional groups also do not substantially interfere with any process described herein that the compound in which they are present may take part in. Examples of functional groups include halo (fluoro, chloro, bromo and iodo), ether such as —OR$^{25}$, —CO$_2$R$^{25}$, —NO$_2$, and —NR$^{25}$, wherein R$^{25}$ is hydrocarbyl or substituted hydrocarbyl. In cases in which the functional group may be near a nickel atom, the functional group should not coordinate to the metal atom more strongly than the groups in compounds which are shown as coordinating to the metal atom, that is they should not displace the desired coordinating group.

By a polymerization catalyst activator is meant a compound that reacts with a transition metal compound to form an active polymerization catalyst. A preferred polymerization catalyst activator is an alkylaluminum compound, that is a compound which has one or more alkyl groups bound to an aluminum atom.

By a polymerization catalyst component is meant a composition that by itself, or after reaction with one or more other compounds (optionally in the presence of the olefins to be polymerized), catalyzes the polymerization of olefins.

By a "monoanionic ligand" is meant a ligand with one negative charge.

By a "neutral ligand" is meant a ligand that is not charged.

"Alkyl group" and "substituted alkyl group" have their usual meaning (see above for substituted under substituted hydrocarbyl). Unless otherwise stated, alkyl groups and substituted alkyl groups preferably have 1 to about 30 carbon atoms.

By a styrene herein is meant a compound of the formula

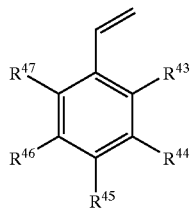

(XXXIV)

wherein $R^{43}$, $R^{44}$, $R^{45}$, $R^{46}$ and $R^{47}$ are each independently hydrogen, hydrocarbyl, substituted hydrocarbyl or a functional group, all of which are inert in the polymerization process. It is preferred that all of $R^{43}$, $R^{44}$, $R^{45}$, $R^{46}$ and $R^{47}$ are hydrogen. Styrene (itself) is a preferred styrene.

By a norbornene is meant ethylidene norbornene, dicyclopentadiene, or a compound of the formula

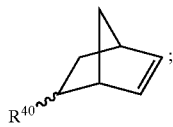

(XXXV)

wherein $R^{40}$ is hydrogen or hydrocarbyl containing 1 to 20 carbon atoms. It is preferred that $R^{40}$ is hydrogen or alkyl, more preferably hydrogen or n-alkyl, and especially preferably hydrogen. The norbornene may be substituted by one or more hydrocarbyl, substituted hydrocarbyl or functional groups in the $R^{40}$ or other positions, with the exception of the vinylic hydrogens, which remain. Norbornene (itself), dimethyl endo-norbornene-2, 3-dicarboxylate, t-butyl 5-norbornene-2-carobxylate are preferred norbornenes and norbornene (itself) is especially preferred.

By a π-allyl group is meant a monoanionic ligand with 3 adjacent $sp^2$ carbon atoms bound to a metal center in an $\eta^3$ fashion. The three $sp^2$ carbon atoms may be substituted with other hydrocarbyl groups or functional groups. Typical π-allyl groups include

-continued

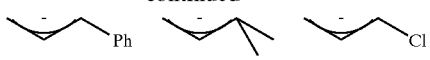

wherein R is hydrocarbyl. By a π-benzyl group is meant π-allyl ligand in which two of the $sp^2$ carbon atoms are part of an aromatic ring. Typical π-benzyl groups include

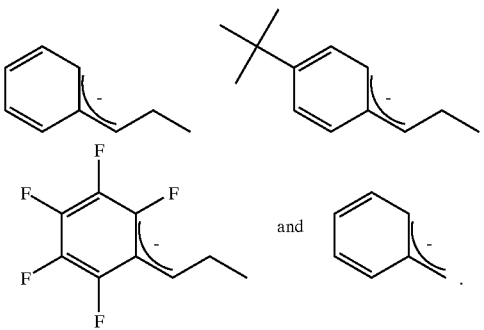

For (I) through (VIII), (XVII), (XVIII) and (XXVII) through (XXX) preferred formulas and compounds (as ligands for polymerization catalysts) are found in U.S. patent applications Ser. No. 09/006,628, filed Jan. 13, 1998 (now U.S. Pat. No. 6,060,569), and Ser. No. 09/006,536, filed Jan. 13, 1998 (now U.S. Pat. No. 6,174,975), and World Patent Applications 98/30610 and 98/30609, and preferred grouping and compounds in these applications are also preferred herein. However the compound numbers and group (i.e., $R^x$) numbers in these applications may vary from those herein, but they are readily convertible.

These applications also describe syntheses of the various ligands, and syntheses of appropriate nickel compounds. There are many different ways of preparing active polymerization catalysts of these types Ni coordination compounds are described in these applications. "Pure" compounds which themselves may be active polymerization catalysts may be used, or the active polymerization catalyst may be prepared in situ by a variety of methods.

Which first active polymerization catalysts will polymerize which olefins will also be found in U.S. patent applications Ser. No. 09/006,628, filed Jan. 13, 1998 (now U.S. Pat. No. 6,060,569), and Ser. No.09/006,536, filed Jan. 13, 1998 (now U.S. Pat. No. 6,174,975), and World Patent Applications 98/30610 and 98/30609. Monomers useful herein include ethylene, propylene, other α-olefins of the formula $R^{67}CH=CH_2$, wherein $R^{67}$ is n-alkyl containing 2 to about 20 carbon atoms, cyclopentene, styrenes and norbornenes. Preferred monomers are ethylene, propylene and cyclopentene, and ethylene is especially preferred.

In one preferred process described herein the first and second olefins are identical, and preferred olefins in such a process are the same as described immediately above. The first and/or second olefins may also be a single olefin or a mixture of olefins to make a copolymer. Again it is preferred that they be identical particularly in a process in which polymerization by the first and second polymerization catalysts make polymer simultaneously.

In some processes herein the first active polymerization catalyst may polymerize a monomer that may not be polymerized by said second active polymerization catalyst, and/or vice versa. In that instance two chemically distinct polymers may be produced. In another scenario two monomers would be present, with one polymerization catalyst producing a copolymer, and the other polymerization catalyst producing a homopolymer, or two copolymers may be produced which vary in the molar proportion or repeat units from the various monomers. Other analogous combinations will be evident to the artisan.

In another variation of the process described herein one of the polymerization catalysts makes an oligomer of an olefin, preferably ethylene, which oligomer has the formula $R^{70}CH=CH_2$, wherein $R^{70}$ is n-alkyl, preferably with an even number of carbon atoms. The other polymerization catalyst in the process then (co)polymerizes this olefin, either by itself or preferably with at least one other olefin, preferably ethylene, to form a branched polyolefin. Preparation of the oligomer. (which is sometimes called an α-olefin) by a second active polymerization-type of catalyst can be found in World Patent Application 96/23010.

Likewise, conditions for such polymerizations, particularly for catalysts of the first active polymerization type, will also be found in these patent applications. Briefly, the temperature at which the polymerization is carried out is about −100° C. to about +200° C., preferably about −20° C. to about +80° C. The polymerization pressure which is used with a gaseous olefin is not critical, atmospheric pressure to about 275 MPa, or more, being a suitable range. With a liquid monomer the monomer may be used neat or diluted with another liquid (solvent) for the monomer. These polymerizations may be batch, semi-batch or continuous processes, and may be carried out in liquid medium or the gas phase (assuming the monomers have the requisite volatility). These details will also be found in U.S. patent applications Ser. No. 09/006,628, filed Jan. 13, 1998 (now U.S. Pat. No. 6,060,569), and Ser. No. 09/006,536, filed Jan. 13, 1998 (now U.S. Pat. No. 6,174,975), and World Patent Applications 98/30,610 and 98/30609.

All the catalysts herein may be "heterogenized" by coating or otherwise attaching them to solid supports, such as silica or alumina. Where an active catalyst species is formed by reaction with a compound such as an alkylaluminum compound, a support on which the alkylaluminum compound is first coated or otherwise attached is contacted with the transition metal compounds (or their precursors) to form a catalyst system in which the active polymerization catalysts are "attached" to the solid support. These supported catalysts may be used in polymerizations in organic liquids. They may also be used in so-called gas phase polymerizations in which the olefin(s) being polymerized are added to the polymerization as gases and no liquid supporting phase is present. The transition metal compounds may also be coated onto a support such as a polyolefin (polyethylene, polypropylene, etc.) support, optionally along with other needed catalyst components such as one or more alkylaluminum compounds.

In these polymerization processes a preferred ligand for the first polymerization catalyst is (II).

Two chemically different active polymerization catalysts are used in the polymerization described herein. The first active polymerization catalyst is described in detail above. The second active polymerization catalyst may also meet the limitations of the first active polymerization catalyst, but must be chemically distinct. For instance, it may have a different transition metal present, and/or utilize a different type of ligand and/or the same type of ligand which differs in structure between the first and second active polymerization catalysts. In one preferred process, the ligand type and the metal are the same, but the ligands differ in their substituents.

Included within the definition of two active polymerization catalysts are systems in which a single polymerization catalyst is added together with another ligand, preferably the same type of ligand, which can displace the original ligand coordinated to the metal of the original active polymerization catalyst, to produce in situ two different polymerization catalysts.

However, other types of catalysts may also be used for the second active polymerization catalyst. The second active polymerization catalyst may be another late transition metal catalyst, for example as described in World Patent Applications 96/23010, 97/02298, 98/30610, 98/30609 and 98/27124. Other useful types of catalysts may also be used for the second active polymerization catalyst. For instance so-called Ziegler-Natta and/or metallocene-type catalysts may also be used. These types of catalysts are well known in the polyolefin field, see for instance Angew. Chem., Int. Ed. Engl., vol. 34, p. 1143–1170 (1995), European Patent Application 416,815 and U.S. Pat. No. 5,198,401 for information about metallocene-type catalysts, and J. Boor Jr., Ziegler-Natta Catalysts and Polymerizations, Academic Press, New York, 1979 for information about Ziegler-Natta-type catalysts, all of which are hereby included by reference. Many of the useful polymerization conditions for all of these types of catalysts and the first active polymerization catalysts coincide, so conditions for the polymerizations with first and second active polymerization catalysts are easily accessible. Oftentimes the "co-catalyst" or "activator" is needed for metallocene or Ziegler-Natta-type polymerizations. In many instances the same compound, such as an alkylaluminum compound, may be used as an "activator" for some or all of these various polymerization catalysts.

Suitable catalysts for the second polymerization catalyst also include metallocene-type catalysts, as described in U.S. Pat. No. 5,324,800 and European Patent Application 129, 368; particularly advantageous are bridged bis-indenyl metallocenes, for instance as described in U.S. Pat. No. 5,145,819 and European Patent Application 485,823. Another class of suitable catalysts comprises the well-known constrained geometry catalysts, as described in European Patent Applications 416,815, 420,436, 671,404, and 643,066 and World Patent Application 91/04257. Also the class of transition metal complexes described in WO 96/13529 can be used.

The molar ratio of the first active polymerization catalyst to the second active polymerization catalyst used will depend on the ratio of polymer from each catalyst desired, and the relative rate of polymerization of each catalyst under the process conditions. For instance, if one wanted to prepare a "toughened" thermoplastic polyethylene that contained 80% crystalline polyethylene and 20% rubbery polyethylene, and the rates of polymerization of the two catalysts were equal, then one would use a 4:1 molar ratio of the catalyst that gave crystalline polyethylene to the catalyst that gave rubbery polyethylene. More than two active polymerization catalysts may also be used if the desired product is to contain more than two different types of polymer.

The polymers made by the first active polymerization catalyst and the second active polymerization catalyst may be made in sequence, i.e., a polymerization with one (either first or second) of the catalysts followed by a polymerization with the other catalyst, as by using two polymerization vessels in series. However it is preferred to carry out the polymerization using the first and second active polymerization catalysts in the same vessel(s), i.e., simultaneously. This is possible because in most instances the first and second active polymerization catalysts are compatible with each other, and they produce their distinctive polymers in the other catalyst's presence.

The polymers produced by this process may vary in molecular weight and/or molecular weight distribution and/ or melting point and/or level of crystallinity, and/or glass transition temperature or other factors. For copolymers the polymers may differ in ratios of comonomers if the different polymerization catalysts polymerize the monomers present at different relative rates. The polymers produced are useful as molding and extrusion resins and in films as for packaging. They may have advantages such as improved melt processing, toughness and improved low temperature properties.

What is claimed is:

1. A process for the polymerization of olefins, comprising, contacting under polymerizing conditions:

(a) a first active polymerization catalyst for said olefins which contains a Ni complex of a ligand selected from the group consisting of:

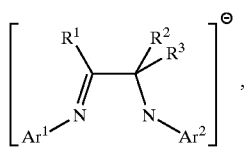
(I)

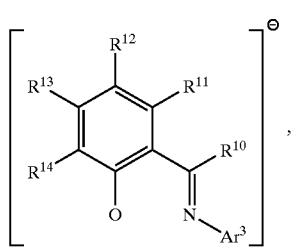
(II)

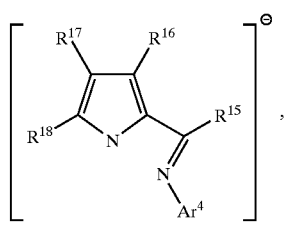
(III)

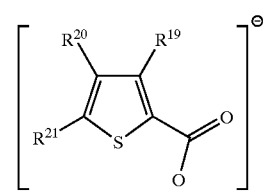
(IV)

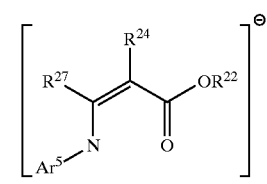
(V)

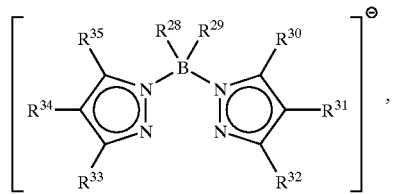
(VI)

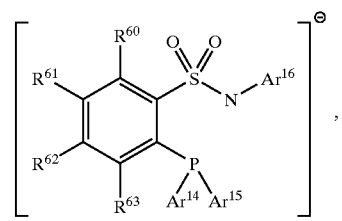
(VII)

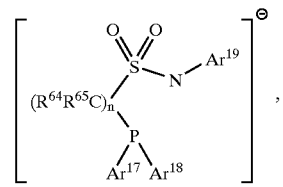
(VIII)

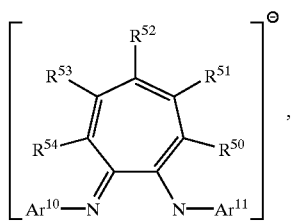
(XVIII)

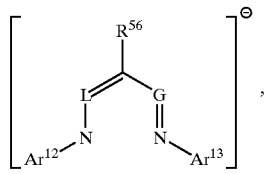
(XXVII)

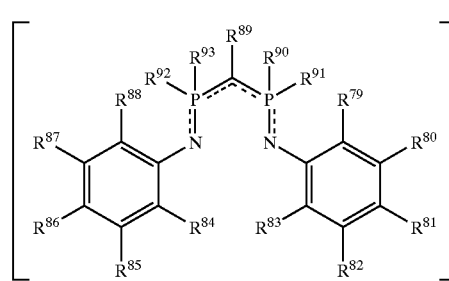
(XXXVII)

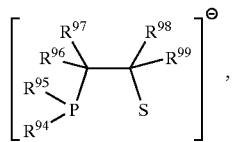
(XXXVIII)

or a compound of the formula

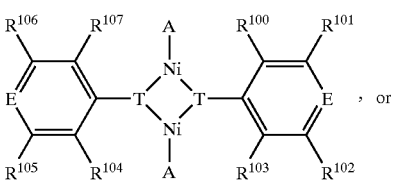
(XXXIX)

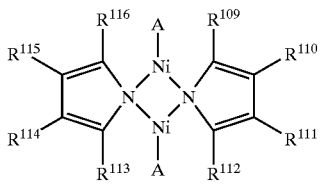

(XXXX)

wherein:

Ar$^1$, Ar$^2$, Ar$^4$, Ar$^5$, Ar$^{10}$, Ar$^{11}$, Ar$^{12}$ and Ar$^{13}$ are each independently aryl or substituted aryl;

R$^1$ and R$^2$ are each independently hydrogen, hydrocarbyl, substituted hydrocarbyl, or R$^1$ and R$^2$ taken together form a ring, and R$^3$ is hydrogen, hydrocarbyl or substituted hydrocarbyl or R$^1$, R$^2$ and R$^3$ taken together form a ring;

A is a π-allyl or π-benzyl group;

R$^{10}$ and R$^{15}$ are each independently hydrogen, hydrocarbyl or substituted hydrocarbyl;

R$^{11}$, R$^{12}$, R$^{13}$, R$^{14}$, R$^{16}$, R$^{17}$, R$^{18}$, R$^{19}$, R$^{20}$, R$^{21}$, R$^{30}$, R$^{31}$, R$^{32}$, R$^{33}$, R$^{34}$, R$^{35}$, R$^{50}$, R$^{51}$, R$^{52}$, R$^{53}$ and R$^{54}$ are each independently hydrogen, hydrocarbyl, substituted hydrocarbyl, an inert functional group, and provided that any two of these groups vicinal to one another taken together may form a ring;

R$^{22}$ is hydrocarbyl, substituted hydrocarbyl, —SR$^{117}$, —OR$^{117}$, or —NR$^{118}{}_2$, R$^{24}$ is hydrogen, a functional group, hydrocarbyl or substituted hydrocarbyl, and R$^{27}$ is hydrocarbyl or substituted hydrocarbyl, and provided that R$^{22}$ and R$^{24}$ or R$^{24}$ and R$^{27}$ taken together may form a ring;

R$^{60}$, R$^{61}$, R$^{62}$ and R$^{63}$ are each independently hydrogen, hydrocarbyl, substituted hydrocarbyl, or an inert functional group;

R$^{64}$ and R$^{65}$ are each independently hydrogen, hydrocarbyl or substituted hydrocarbyl;

n is 1, 2 or 3;

Ar$^{14}$, Ar$^{15}$, Ar$^{16}$, Ar$^{17}$, Ar$^{18}$ and Ar$^{19}$ are each independently hydrocarbyl or substituted hydrocarbyl;

R$^{117}$ is hydrocarbyl or substituted hydrocarbyl;

each R118 is independently hydrogen, hydrocarbyl or substituted hydrocarbyl;

G and L are both N or G is CR$^{57}$ and L is CR$^{55}$;

R$^{55}$, R$^{56}$ and R$^{57}$ are each independently hydrogen, hydrocarbyl or substituted hydrocarbyl, or any two of R$^{55}$, R$^{56}$ and R$^{57}$ taken together form a ring;

Ar$^3$ is hydrocarbyl or substituted hydrocarbyl;

R$^{79}$, R$^{80}$, R$^{81}$, R$^{82}$, R$^{83}$, R$^{84}$, R$^{85}$, R$^{86}$, R$^{87}$, R$^{88}$ and R$^{89}$ are each independently hydrogen, hydrocarbyl, substituted hydrocarbyl, or a functional group;

R$^{90}$, R$^{91}$, R$^{92}$ and R$^{93}$ are each independently hydrocarbyl or substituted hydrocarbyl;

R$^{94}$ and R$^{95}$ are each independently hydrocarbyl or substituted hydrocarbyl;

R$^{96}$, R$^{97}$, R$^{98}$, and R$^{99}$ are each independently hydrogen, hydrocarbyl, substituted hydrocarbyl or a functional group;

both of T are S (sulfur) or NH (amino);

each E is N (nitrogen) or CR$^{108}$ wherein R$^{108}$ is hydrogen, hydrocarbyl, substituted hydrocarbyl or a functional group; independently hydrogen, hydrocarbyl, substituted hydrocarbyl, or a functional group;

R$^{100}$, R$^{101}$, R$^{102}$, R$^{103}$, R$^{104}$, R$^{105}$, R$^{106}$ and R$^{107}$ are each independently hydrogen, hydrocarbyl, substituted hydrocarbyl or a functional group;

R$^{109}$, R$^{110}$, R$^{111}$, R$^{112}$, R$^{113}$, R$^{114}$, R$^{115}$ and R$^{116}$ are each independently hydrogen, hydrocarbyl, substituted hydrocarbyl or a functional group;

R$^{28}$ and R$^{29}$ are each independently hydrogen, hydrocarbyl or substituted hydrocarbyl;

(b) a second active polymerization catalyst for said olefins which contains one or more transition metals;

(c) a least one first olefin capable of being polymerized by said first active polymerization catalyst; and (d) at least one second olefin capable of being polymerized by said second active polymerization catalyst.

2. The process as recited in claim 1 wherein said ligand is (II).

3. The process as recited in claim 1 wherein said second active polymerization catalyst has a formula as defined for said first active polymerization catalyst, but is different from said first active polymerization catalyst.

4. The process as recited in claim 1 wherein said second active polymerization catalyst is a Ziegler-Natta or a metallocene type polymerization catalyst.

5. The process as recited in claim 1, 2, 3, or 4 wherein said first olefin and said second olefin are each independently one or more of ethylene, propylene, an olefin of the formula R$^{67}$CH=CH$_2$ wherein R$^{67}$ is n-alkyl containing 2 to about 20 carbon atoms, cyclopentene, a styrene or a norbornene.

6. The process as recited in claim 1, 2, 3, or 4 wherein said first olefin and said second olefin is each independently one or both of ethylene or propylene.

7. The process as recited in claim 1, 2, 3, or 4 wherein said first olefin and said second olefin are ethylene.

8. The process as recited in claim 1 wherein said polymerization with said first active polymerization catalyst and said polymerization with said second polymerization catalyst are carried out simultaneously.

9. The process as recited in claim 1 wherein said first olefin and said second olefin are the same.

10. The process as recited in claim 1 wherein said ligand is (I).

11. The process as recited in claim 1 wherein said ligand is (III).

12. The process as recited in claim 1 wherein said ligand is (IV).

13. The process as recited in claim 1 wherein said ligand is (V).

14. The process as recited in claim 1 wherein said ligand is (VI).

15. The process as recited in claim 1 wherein said ligand is (VII) or (VIII).

16. The process as recited in claim 1 wherein said ligand is (XVIII).

17. The process as recited in claim 1 wherein said ligand is (XXVII).

18. The process as recited in claim 1 wherein said ligand is (XXXVII).

19. The process as recited in claim 1 wherein said ligand is (XXXVIII).

20. The process as recited in claim 1 wherein said nickel complex is a compound of the formula (XXXIX) or (XXXX).

* * * * *